United States Patent
Lee et al.

(10) Patent No.: US 8,917,659 B2
(45) Date of Patent: Dec. 23, 2014

(54) METHOD OF TRANSMITTING WARNING MESSAGE IN MULTIPLE COMPONENT CARRIER SYSTEM

(75) Inventors: Young Dae Lee, Anyang-si (KR); Sung Hoon Jung, Anyang-si (KR); Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 529 days.

(21) Appl. No.: 12/914,501

(22) Filed: Oct. 28, 2010

(65) Prior Publication Data

US 2011/0103308 A1    May 5, 2011

Related U.S. Application Data (60) Provisional application No. 61/256,294, filed on Oct. 29, 2009.

(51) Int. Cl.
| | |
|---|---|
| H04W 4/00 | (2009.01) |
| H04J 3/26 | (2006.01) |
| H04M 11/04 | (2006.01) |
| H04W 48/12 | (2009.01) |
| H04W 4/22 | (2009.01) |
| H04W 76/00 | (2009.01) |
| H04L 5/00 | (2006.01) |
| H04W 4/06 | (2009.01) |
| H04W 72/04 | (2009.01) |

(52) U.S. Cl.
CPC ............... *H04W 48/12* (2013.01); *H04W 4/22* (2013.01); *H04W 76/002* (2013.01); *H04L 5/001* (2013.01); *H04W 4/06* (2013.01); *H04W 72/042* (2013.01)
USPC ...... 370/328; 370/432; 455/404.1; 455/422.1

(58) Field of Classification Search
None
See application file for complete search history.

(56) References Cited

U.S. PATENT DOCUMENTS

| | | | |
|---|---|---|---|
| 2010/0075625 A1* | 3/2010 | Wu ............................ | 455/404.1 |
| 2010/0227569 A1* | 9/2010 | Bala et al. ....................... | 455/73 |
| 2010/0303039 A1* | 12/2010 | Zhang et al. .................. | 370/331 |
| 2011/0002281 A1* | 1/2011 | Terry et al. .................... | 370/329 |
| 2011/0014891 A1* | 1/2011 | Bleckert et al. ............ | 455/404.1 |
| 2011/0026498 A1* | 2/2011 | Zheng et al. .................. | 370/336 |
| 2011/0267957 A1* | 11/2011 | Du et al. ....................... | 370/241 |
| 2012/0099464 A1* | 4/2012 | Chun et al. ..................... | 370/252 |

OTHER PUBLICATIONS

Terry et al., U.S. Appl. No. 61/233,953, Aug. 14, 2009.*
Zhang et al., U.S. Appl. No. 61/159,606, Mar. 12, 2009.*

* cited by examiner

*Primary Examiner* — Faruk Hamza
*Assistant Examiner* — Cassandra Decker
(74) *Attorney, Agent, or Firm* — Morgan, Lewis & Bockius LLP (57) ABSTRACT

A method of transmitting a warning message in a multiple carrier system performed by a network is provided. The method includes transmitting configuration information on aggregated downlink carriers for a user equipment (UE), transmitting, to the UE, carrier information on a first downlink carrier which is used to transmit a warning message, transmitting, to the UE, a notification which informs the UE of the upcoming transmission of the warning message via a second downlink carrier, and transmitting, to the UE, the warning message via the first downlink carrier.

8 Claims, 10 Drawing Sheets

METHOD OF TRANSMITTING WARNING MESSAGE IN MULTIPLE COMPONENT CARRIER SYSTEM

CROSS-REFERENCE TO RELATED APPLICATIONS

This application claims the benefit of priority of U.S. Provisional Application No. 61/256,294 filed on Oct. 29, 2009 which is incorporated by reference in their entirety herein.

BACKGROUND

1. Field of the Invention

The present invention is related to a wireless communication, more particularly to a method of transmitting a warning message in a multiple component carrier system.

2. Related Art

In a common wireless communication system, although the bandwidth of uplink and the bandwidth of downlink are differently set up, only one carrier is taken into consideration. Even in 3rd Generation Partnership Project (3GPP) Long Term Evolution (LTE), the number of carriers constituting uplink and downlink is 1, and the bandwidth of uplink and the bandwidth of downlink bandwidth are in general symmetrical to each other on the basis of a single carrier. However, it is not easy to allocate a large frequency bandwidth except some regions in the world. Accordingly, in order to efficiently use small sliced bands, a carrier aggregation technique for producing the same effect as that a logically large band is used by binding a plurality of physically non-continuous bands in the frequency domain is being developed. The carrier aggregation technique includes, for example, a technique in which system bandwidth of 100 MHz is supported by using multiple carriers.

Recently there has been an interest to ensure that the public has the capability to receive timely and accurate alerts, warnings and critical information regarding disasters and other emergencies irrespective of what communications technologies they use. As has been learned from disasters such as earthquakes, tsunamis, hurricanes and wild fires; such a capability is essential to enable the public to take appropriate action to protect their families and themselves from serious injury, or loss of life or property. This interest to enhance the reliability, resiliency, and security of Warning Notifications to the public by providing a mechanism to distribute Warning Notifications over wireless systems is the impetus for the Public Warning System (PWS).

If multiple downlink carriers are aggregated, PWS messages are broadcast from each downlink (DL) carrier. Hence, the same PWS messages will be duplicated on all DL carriers which are aggregated.

To avoid duplicated transmission of PWS messages from all aggregated DL carriers, eNB may broadcast PWS messages only from one of the aggregated DL carriers, in particular from non-backward compatible carrier or extension carrier. However, UE staying at a DL carrier which does not broadcast PWS messages cannot receive the PWS messages.

SUMMARY

The present invention provides a method of transmitting a warning message in multiple component carrier system.

According to an aspect of the present invention, a method of transmitting a warning message in a multiple carrier system performed by a network is provided. The method includes transmitting configuration information on aggregated downlink carriers for a user equipment (UE), transmitting, to the UE, carrier information on a first downlink carrier which is used to transmit a warning message, transmitting, to the UE, a notification which informs the UE of the upcoming transmission of the warning message via a second downlink carrier, and transmitting, to the UE, the warning message via the first downlink carrier.

According to another aspect of the present invention, a method of receiving a warning message in a multiple carrier system performed by a user equipment (UE) is provided. The method includes configuring aggregated downlink carriers, receiving, from a network, carrier information on a first downlink carrier which is used to transmit a warning message, receiving, from the network, a notification which informs the UE of the upcoming transmission of the warning message via a second downlink carrier, and receiving, from the network, the warning message via the first downlink carrier.

DESCRIPTION OF EXEMPLARY EMBODIMENTS

Some embodiments of the present invention will now be described in detail with reference to the accompanying drawings. It is to be noted that in assigning reference numerals to respective constituent elements in the drawings, the same reference numerals designate the same constituent elements although the constituent elements are shown in different drawings. Further, in describing the embodiments of the present invention, a detailed description of pertinent known constructions or functions will be omitted if it is deemed to make the gist of the present invention unnecessarily vague.

Further, in this specification, a wireless communication network is chiefly described. However, tasks performed in the wireless communication network can be performed in a process of a network managing system (e.g., a base station), such as controlling the wireless communication network and sending data, or can be performed in a mobile station coupled to the corresponding wireless communication network.

Figure 1:
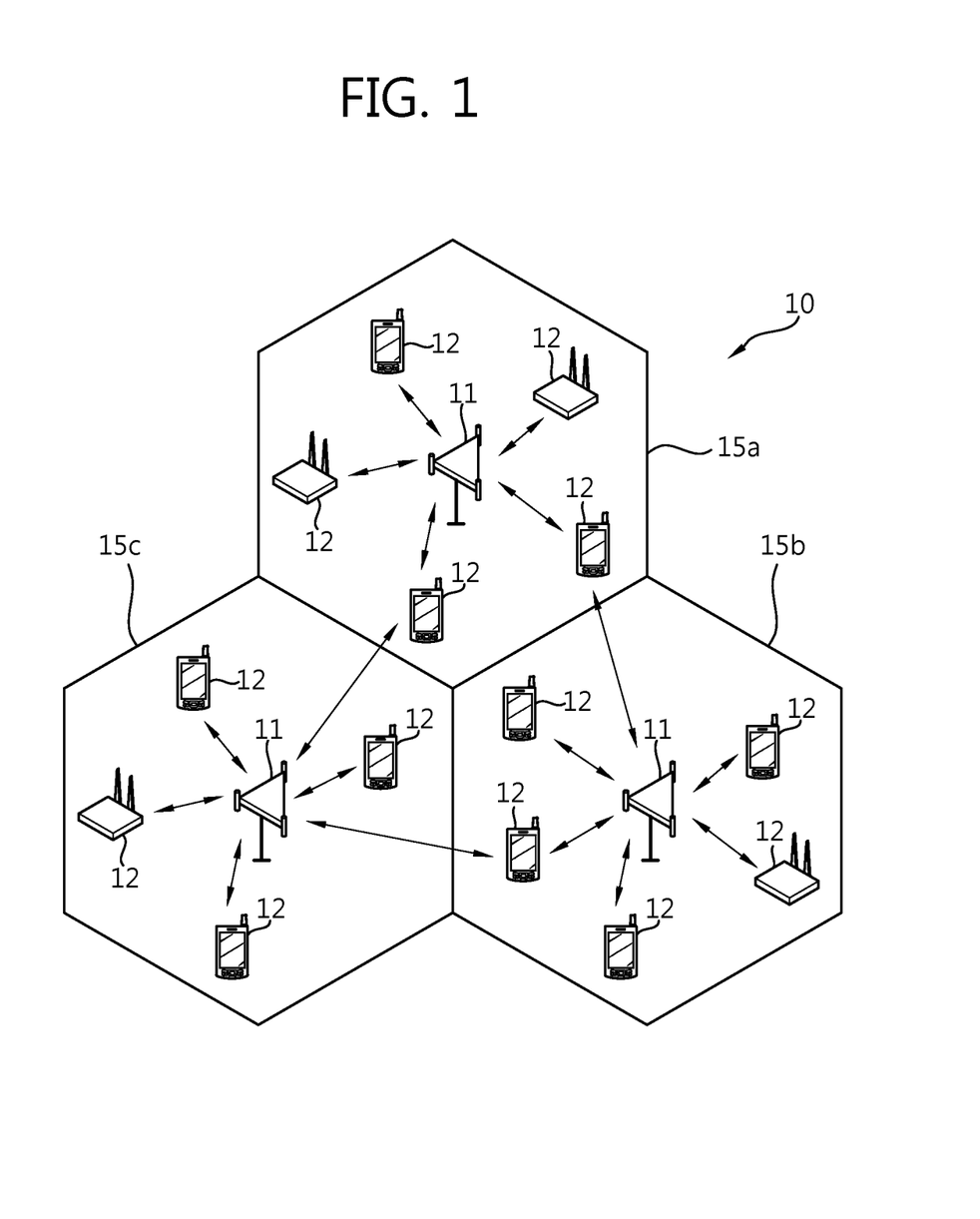
FIG. 1 is a diagram showing a wireless communication system. Earthquake and Tsunami Warning System

FIG. 1 is a diagram showing a wireless communication system.

Referring to FIG. 1, a wireless communication system 10 is broadly deployed to provide various communication services such as voice, packet data.

The wireless communication system 10 includes at least one Base Station (hereinafter referred to as 'BS') 11. The BSs provide communication services to respective geographical areas (in general, called 'cells') 15a, 15b, and 15c. The cell can be divided into a plurality of areas (called 'sectors').

A Mobile Station (hereinafter referred to as an 'MS') 12 can be fixed and mobile and also referred to as another terminology, such as a User Equipment (UE), a Mobile Terminal (MT), a User Terminal (UT), a Subscriber Station (SS), a wireless device, a Personal Digital Assistant (PDA), a wireless modem, or a handheld device.

The BS 11 commonly refers to a fixed station which communicates with the MSs 12, and it can be referred to as another terminology, such as an evolved-NodeB (eNB), a Base Transceiver System (BTS), or an access point (AP). The cell should be comprehensively interpreted to indicate some frequencies provided by the BS 11. The cell includes a variety of coverage areas, such as a mega cell, a macro cell, a micro cell, a pico cell, and a femto cell. The BS 11 hosts the following functions:

Functions for Radio Resource Management: Radio Bearer Control, Radio Admission Control, Connection Mobility Control, Dynamic allocation of resources to UEs in both uplink and downlink (scheduling);
IP header compression and encryption of user data stream;
Routing of User Plane data towards Serving Gateway;
Scheduling and transmission of paging messages;
Scheduling and transmission of broadcast information
Measurement and measurement reporting configuration for mobility and scheduling;
Scheduling and transmission of Public Warning System (PWS) (which includes Earthquake and Tsunami Warning System (ETWS) and Commercial Mobile Alert System (CMAS)) messages;
Closed Subscriber Group (CSG) handling.

Hereinafter, downlink refers to communication from the BS 11 to the MS 12, and uplink refers to communication from the MS 12 to the BS 11. In the downlink, a transmitter can be part of the BS 11 and a receiver can be part of the MS 12. In the uplink, a transmitter can be part of the MS 12 and a receiver can be part of the BS 11.

There are no limits to multiple access schemes to which a wireless communication system is applied. A variety of multiple access schemes, such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, and OFDM-CDMA, can be used. A Time Division Duplex (TDD) method of performing uplink transmission and downlink transmission at different times or a Frequency Division Duplex (FDD) method of performing uplink transmission and downlink transmission using different frequencies can be used.

The layers of a radio interface protocol between an MS and a network can be classified into L1 (i.e., a first layer), L2 (i.e., a second layer), and L3 (i.e., a third layer) based on the three lower layers of an Open System Interconnection (OSI) reference model which is widely known in the communication system.

The physical layer belonging to the first layer provides information transfer service to a higher layer using the physical channel. The physical layer is connected to a Medium Access Control (hereinafter referred to as 'MAC') layer through a transport channel which is placed in a higher layer. Information is moved between the medium access control layer and the physical layer through the transport channel.

Further, Information is moved between different physical layers (i.e., the physical layers on the transmission side and the reception side) through the physical channel. The physical channel is modulated using an OFDM (Orthogonal Frequency Division Multiplexing) method, and it uses the time and frequency as radio resources.

The MAC layer of the second layer provides service layer through a logical channel to a Radio Link Control (hereinafter referred to as 'RLC') layer which is higher than the MAC layer. The RLC layer of the second layer supports reliable data transmission. The function of the RLC layer may be implemented using a function block within the MAC layer. In such a case, the RLC layer may not exist. The PDCP layer of the second layer performs a header compression function for reducing the size of an IP packet header including relatively large and unnecessary control information so that an IP packet, such as IPv4 or IPv6, can be efficiently sent in a radio range having a small bandwidth.

A Radio Resource Control (hereinafter referred to as 'RRC') layer is related to the configuration, re-configuration, and release of a Radio Bearer (hereinafter referred to as a 'RB) and is responsible for the control of logical channels, transport channels, and physical channels. Here, the RB refers to service provided by the second layer for data transfer between an MS and an UTRAN. In the case in which RRC connection exists between the RRC of an MS and the RRC layer of a wireless network, the MS is in the RRC connected mode. In the case in which RRC connection does not exist between the RRC of an MS and the RRC layer of a wireless network, the MS is in the RRC idle mode. A Non-Access Stratum (NAS) layer placed over the RRC layer performs functions, such as session management and mobility management.

Carrier Aggregation (CA) is a type of radio configuration which provides aggregation of two or more component carriers in order to support wider transmission bandwidths up to 100 MHz. CA is also called a spectrum aggregation or a bandwidth aggregation. An individual unit carrier bound by CA is referred to as a Component Carrier or a Carrier (hereinafter referred to as a 'CC'). Each CC is defined by a bandwidth and a center frequency. The CA is used to support an increasing throughput, prevent an increase of the costs resulting from the introduction of broadband RF (radio frequency) devices, and guarantee compatibility with the existing system.

For example, assuming that 5 CCs are allocated as the granularity of a carrier unit having a bandwidth of 5 MHz, a maximum of a bandwidth of 20 MHz can be supported.

Figure 2:
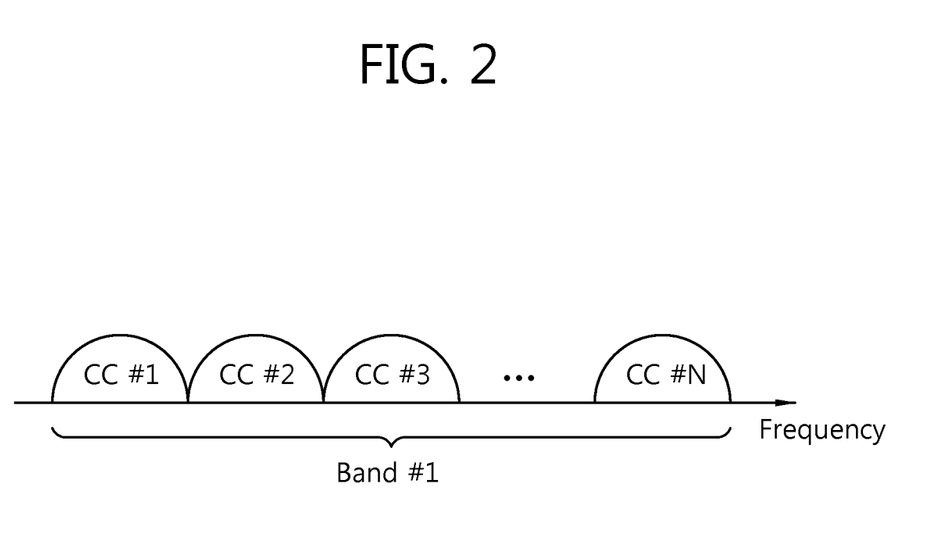
FIG. 2 is an example of the intra-band contiguous carrier aggregation
Figure 3:
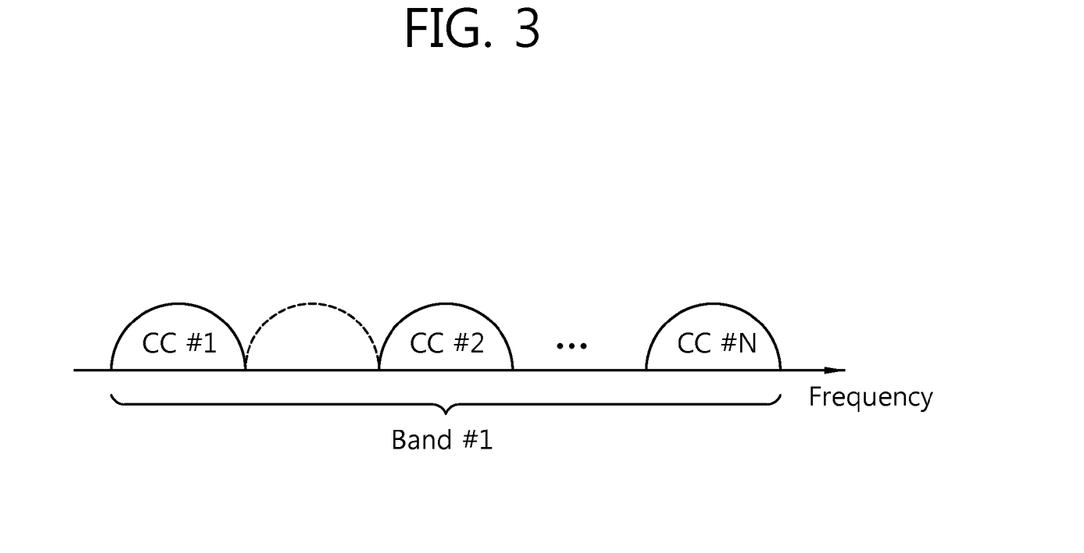
FIG. 3 is an example of the intra-band non-contiguous carrier aggregation
Figure 4:
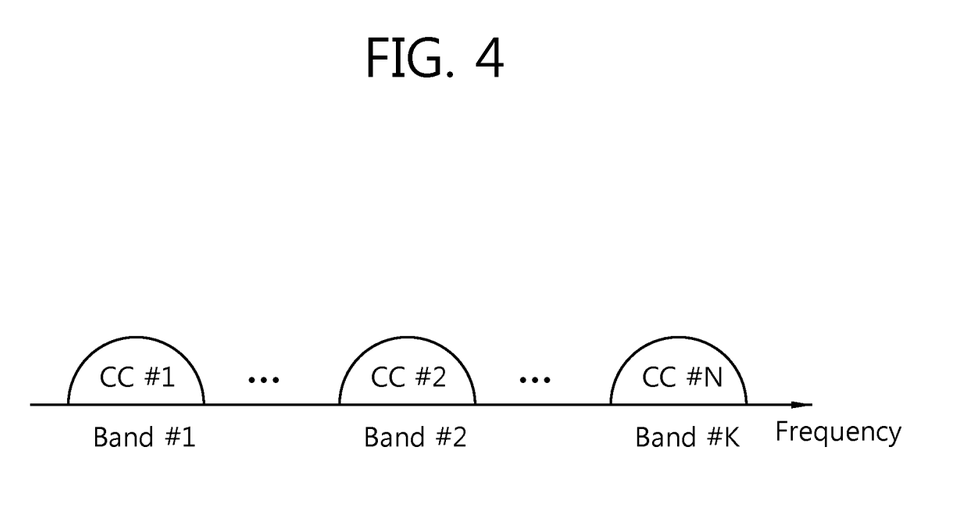
FIG. 4 is an example of the inter-band carrier aggregation.

The carrier aggregation can include the intra-band contiguous carrier aggregation such as that shown in FIG. 2, the intra-band non-contiguous carrier aggregation such as that shown in FIG. 3, and the inter-band carrier aggregation such as that shown in FIG. 4.

Referring first to FIG. 2, the intra-band contiguous carrier aggregation is performed between CCs consecutive to each other in the intra-band. For example, all CC#1, CC#2, CC#3, . . . , CC #N (i.e., aggregated CCs) are consecutive to each other.

Referring to FIG. 3, the intra-band non-contiguous carrier aggregation is performed between discontinuous CCs. For example, CC#1 and CC#2 (i.e., aggregated CCs) are spaced apart from each other with a specific frequency interposed therebetween.

Referring to FIG. 4, in the inter-band carrier aggregation, one or more of a plurality of CCs are aggregated on another frequency band. For example, a CC #1 (i.e., an aggregated CC) can exist in a band #1 and a CC #2 can exist in a band #2.

The number of aggregated downlink CCs and the number of aggregated uplink CCs can be differently configured. A case in which the number of downlink CCs is identical to the number of uplink CCs is called a symmetric aggregation, and a case in which the number of downlink CCs is different from the number of uplink CCs is called an asymmetrical aggregation.

Further, CCs can have different sizes (i.e., bandwidths). For example, assuming that 5 CCs are used to construct a 70 MHz band, the construction can include, for example, 5 MHz CC (carrier #0)+20 MHz CC (carrier #1)+20 MHz CC (carrier #2)+20 MHz CC (carrier #3)+5 MHz CC (carrier #4).

Hereinafter, a multiple carrier system refers to a system supporting the carrier aggregation. In the multiple carrier system, a contiguous carrier aggregation or a non-contiguous carrier aggregation or both can be used. Further, either a symmetrical aggregation or an asymmetrical aggregation can be used.

Figure 5:
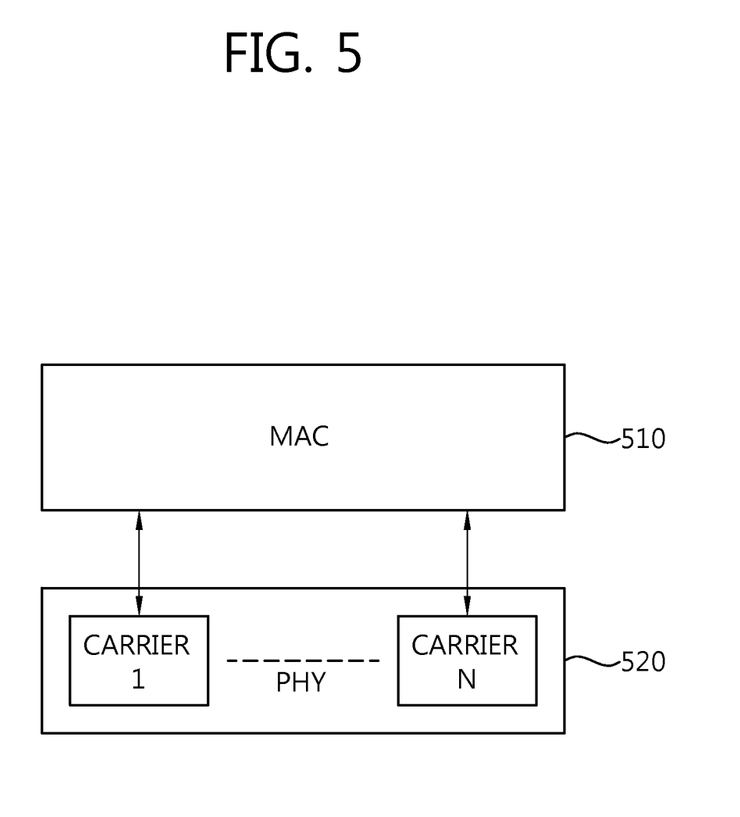
FIG. 5 is a diagram showing an example of a protocol structure for supporting multiple CCs.

FIG. 5 is a diagram showing an example of a protocol structure for supporting multiple CCs.

Referring to FIG. 5, a common MAC entity 510 manages a physical layer 520 which uses a plurality of CCs. A MAC management message transmitted through a specific CC can be applied to other CCs. That is, the MAC management message can control other CCs including the specific CCs. The physical layer 520 can be operated according to a TDD or a FDD or both.

Several physical control channels are used in the physical layer 520. A Physical Downlink Control Channel (PDCCH) used to transmit physical control information informs an MS of the resource allocation of a PCH (paging channel) and a downlink shared channel (DL-SCH) and Hybrid Automatic Repeat Request (HARQ) information related to the DL-SCH. The PDCCH also carries an uplink grant informing an MS of the allocation of resources, MCS level and uplink power control information, etc. for uplink transmission.

A Physical Control Format Indicator Channel (PCFICH) is used to inform an MS of the number of OFDM symbols used in PDCCHs and transmitted every frame. A Physical Hybrid ARQ Indicator Channel (PHICH) carries HARQ ACK/NAK signals in response to uplink transmission. A Physical Uplink Control Channel (PUCCH) carries HARQ ACK/NAK signals for downlink transmission, a scheduling request, and uplink control information such as a Channel Quality Indicator (CQI). A Physical Uplink Shared Channel (PUSCH) carries an UL-SCH (uplink shared channel).

Figure 6:
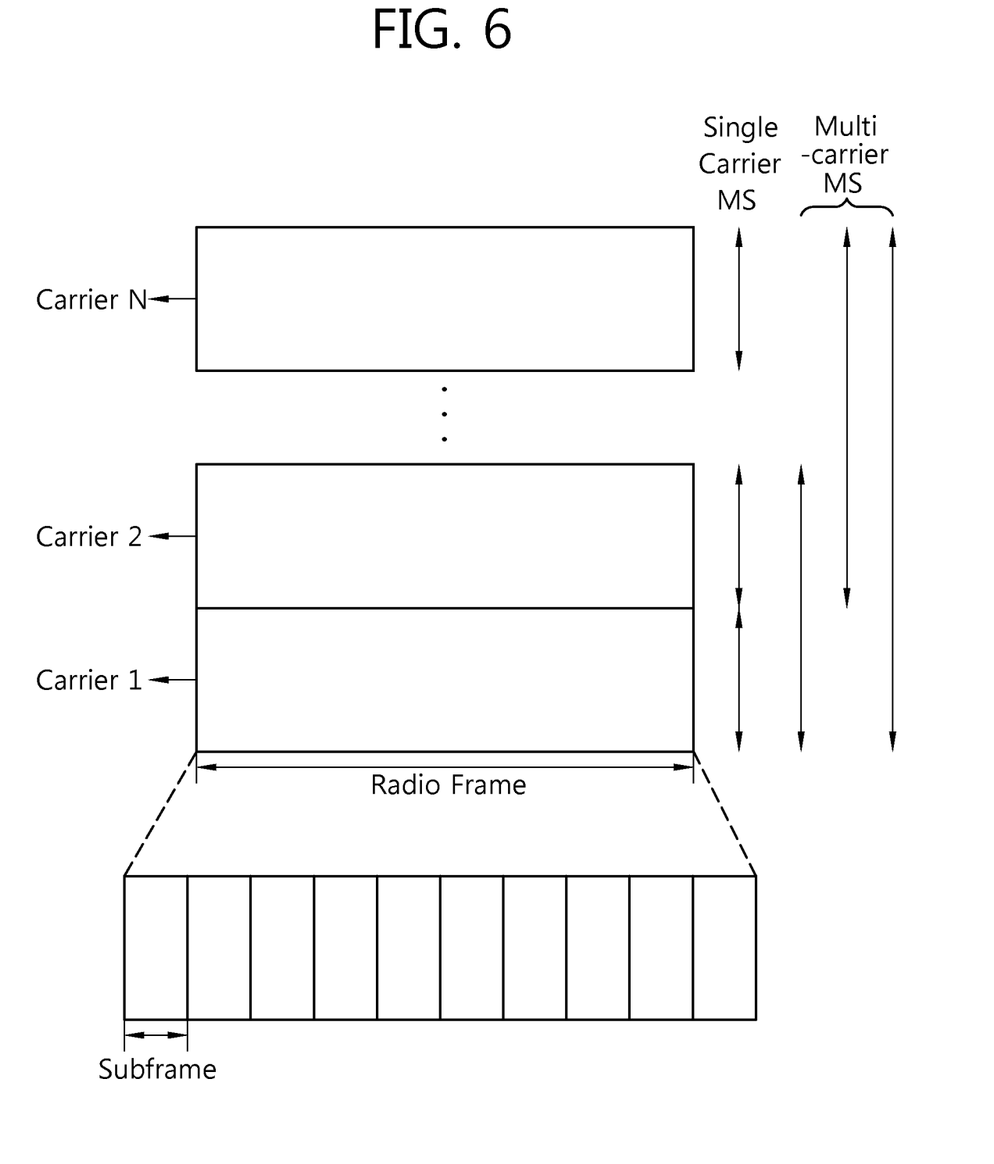
FIG. 6 is a diagram showing an example of a frame structure for a multiple component carrier operation.

FIG. 6 is a diagram showing an example of a frame structure for a multiple component carrier operation.

Referring to FIG. 6, a radio frame consists of 10 subframes. Each of the subframes includes a plurality of OFDM symbols. Each CC can have its own control channel (e.g., a PDCCH). The CCs may be contiguous to each other or may not be contiguous to each other. An MS can support one or more CCs according to its capability.

CCs can be classified into a Primary Component Carrier (hereinafter referred to as a 'PCC') and a Secondary Component Carrier (hereinafter referred to as an 'SCC') whether it is activated. The PCC is always activated, and the SCC is activated or deactivated according to specific conditions.

The term 'activation' means that traffic data are being transmitted or received or are in a ready state. The term 'deactivation' means that the transmission or reception of traffic data is impossible, but measurement or the transmission or reception of minimum information is possible.

An MS can use only one PCC or can use one or more SCCs together with the PCC. A PCC or a SCC or both can be allocated to an MS by a BS. The PCC can be used for an MS to enter a network or used to allocate an SCC or both. A carrier set to an SCC can also be changed to a PCC.

Figure 7:
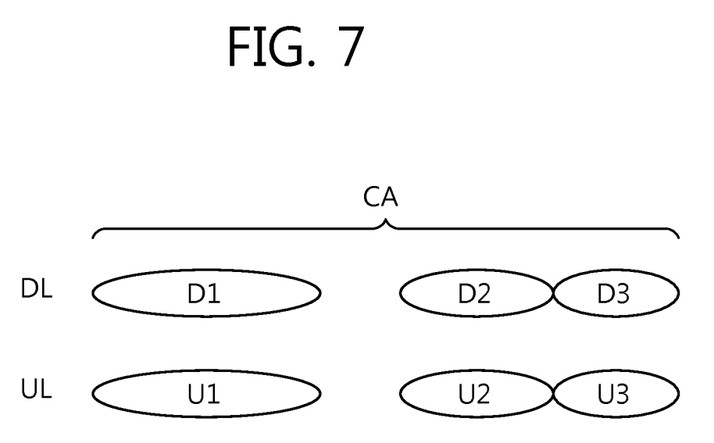
FIG. 7 is a diagram showing a linkage between a downlink component carrier and an uplink component carrier in a multiple carrier system.

FIG. 7 is a diagram showing a linkage between a downlink component carrier and an uplink component carrier in a multiple carrier system.

Referring to FIG. 7, in downlink, Downlink Component Carriers (hereinafter referred to as 'DL CC') D1, D2, and D3 are aggregated. In uplink, Uplink Component Carriers (hereinafter referred to as 'UL CC') U1, U2, and U3 are aggregated. Here, Di is an index of a DL CC, and Ui is an index of an UL CC (where i=1, 2, 3). At least one DL CC is a PCC, and the remaining DL CCs are SCCs. Likewise, at least one UL CC is a PCC and the remaining UL CCs are SCCs. For example, D1 and U1 can be PCCs, and D2, U2, D3, and U3 can be SCCs.

In an FDD system, a DL CC and an UL CC are linked to each other in a one-to-one manner. D1 is linked to U1, D2 is linked to U2, and D3 is linked to U3 in a one-to-one manner. An MS links DL CCs and an UL CC through system information transmitted by a logical channel BCCH or an RRC message dedicated for an MS, transmitted by a DCCH. Each link may be set up in a cell-specific manner or an MS-specific manner.

Examples of an UL CC linked to a DL CC are as follows.
1) UL CC through which ACK/NACK information will be transmitted by an MS with respect to data transmitted by a BS through a DL CC.
2) DL CC through which ACK/NACK information will be transmitted by a BS with respect to data transmitted by an MS through an UL CC.
3) DL CC through which a response to a Random Access Preamble (RAP) will be transmitted by a BS, the RAP being transmitted through an UL CC by an MS which starts a random access procedure.
4) UL CC to which uplink control information is applied when a BS sends uplink control information through a DL CC.

FIG. 7 illustrates only the 1:1 linkage between a DL CC and an UL CC, but a different linkage, such as 1:n or n:1, can be established. Further, the index of a CC does not always correspond to the physical order of the CC or the location of a frequency band of the corresponding CC.

In a multiple component carrier system, each idle MS can select a specific CC or cell through which radio connection between the each idle MS and a BS will be configured. For example, in the case in which radio connection to an MS is configured through a cell 2 of CC1, it may be said that the radio connection is configured through the CC1 or configured through the cell 2. Hereinafter, it is assumed that radio connection is configured in the CC dimension for consistency of description.

Public Warning System (PWS) is used to broadcast a warning message to UEs. Earthquake and Tsunami Warning System (ETWS) in EU and Japan and Commercial Mobile Alert System (CMAS) in North America are examples of PWS.

ETWS primary notification and/or ETWS secondary notification can occur at any point in time. The Paging message is used to inform ETWS capable UEs in RRC_IDLE and UEs in RRC_CONNECTED about presence of an ETWS primary notification and/or ETWS secondary notification. If the UE receives a Paging message including the etws-Indication, it shall start receiving the ETWS primary notification and/or ETWS secondary notification according to schedulingInfoList contained in SystemInformationBlockType1.

ETWS primary notification is contained in SystemInformationBlockType10 and ETWS secondary notification is contained in SystemInformationBlockType11. Segmentation can be applied for the delivery of a secondary notification. The segmentation is fixed for transmission of a given secondary notification within a cell (i.e. the same segment size for a given segment with the same messageIdentifier, serialNumber and warningMessageSegmentNumber).

CMAS notification can occur at any point in time. The Paging message is used to inform CMAS capable UEs in RRC_IDLE and UEs in RRC_CONNECTED about presence of one or more CMAS notifications. If the UE receives a Paging message including the cmas-Indication, it shall start receiving the CMAS notifications according to schedulingInfoList contained in SystemInformationBlockType1.

CMAS notification is contained in SystemInformationBlockType12. Segmentation can be applied for the delivery of a CMAS notification. The segmentation is fixed for transmission of a given CMAS notification within a cell (i.e. the same segment size for a given segment with the same messageIdentifier, serialNumber and warningMessageSegmentNumber). E-UTRAN does not interleave transmissions of CMAS notifications, i.e. all segments of a given CMAS notification transmission are transmitted prior to those of another CMAS notification.

Figure 8:
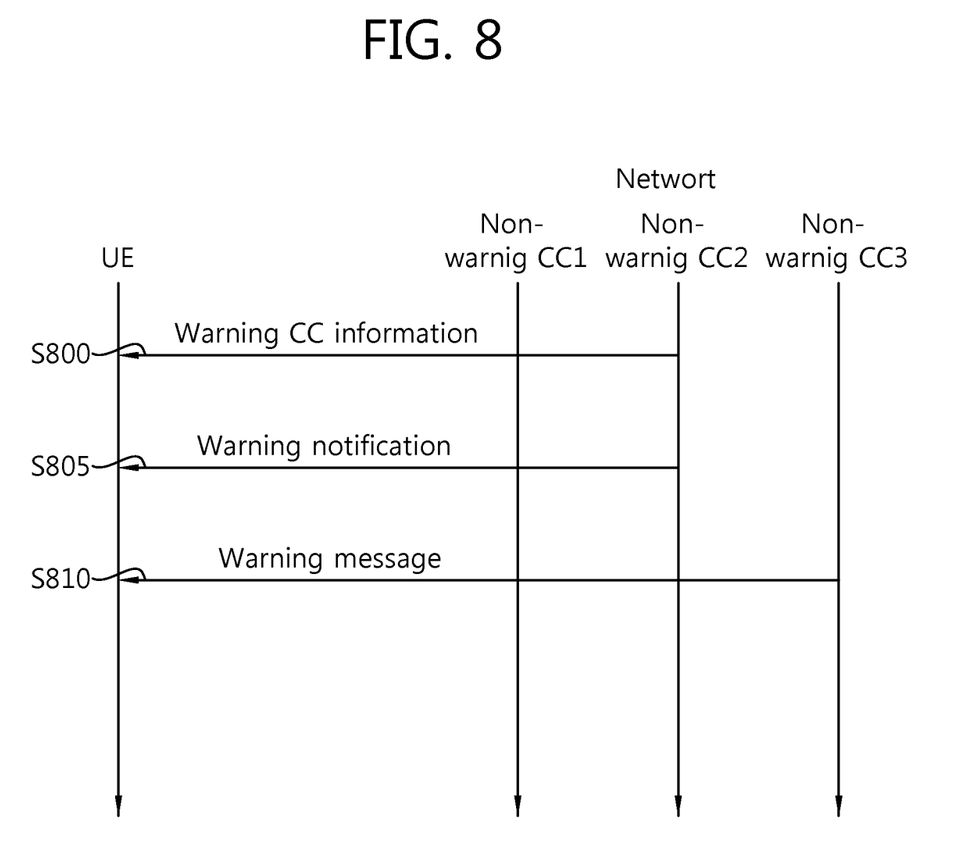
FIG. 8 shows a method of transmitting a warning message in multiple component carrier system according to an embodiment of the present invention.

FIG. 8 shows a method of transmitting a warning message in multiple component carrier system according to an embodiment of the present invention.

Referring to FIG. 8, a network transmits warning CC information on non-warning-CC2 to a user equipment (UE) S800. Before receiving the warning message, the UE needs to know through which CC the warning messages are transmitted. For example, if multiple DL carriers e.g. DL CC1, DL CC2, DL CC3 are aggregated, the network transmits a warning message only from one of the DL carrier e.g. DL CC1 which is called a warning-CC. To allow the UE to know the warning-CC, the network transmits the warning CC information to the UE.

And a CC that does not broadcast the warning message is called a non-warning-CC. A non-warning-CC could be either a non-backward compatible CC or an extension CC. The warning CC information indicates warning-CCs and/or non-warning-CCs for the UE. The warning CC information includes a specific warning-CC or the list of warning-CC(s).

The warning CC information is transmitted by at least one of RRC signaling, MAC signaling and PHY signaling. Or the warning CC information is included in system information such as SIB1 in a cell.

The network transmits a warning notification on the non-warning-CC2 to the UE S805. The warning notification is used to inform the UE about an upcoming warning message, which will be transmitted in one SIB or more. The warning notification can be referred to as a PWS notification, a primary notification or a CMAS notification.

The network transmits a warning message on warning-CC3 to the UE S810. The UE receives the new warning message based on the received warning notification.

The warning message includes the following contents: Event Description, Area Affected, Recommended Action, Expiration Time (with time zone), Sending Agency. And additional contents may be present in the warning message, based on regulatory requirements.

Hereinafter, properties of a warning notification and a warning message are introduced.

I. Warning Notification

1. Transmission of warning notification before transmission of warning messages

The warning notification is transmitted by one of the following ways.

By paging: UE receives the indication from the paging;
By system information e.g. SIB Type 1: UE receives the indication from system information;
By PDCCH with a warning specific Radio Network Temporary Identity (RNTI): UE receives the indication on PDCCH with the RNTI specific RNTI;
By a MAC control element on a common channel: UE receives the indication from the MAC control element on the common channel;
By a RRC message on a common channel: UE receives the indication from the RRC message on the common channel;
By a dedicated signaling to a specific UE: UE receives the indication from the dedicated signaling;

Meanwhile, even if the warning notification is not transmitted on SIB1 e.g. but transmitted in paging, SIB1 on a warning-CC can indicate that any warning message is present on a warning-CC. Also, SIB1 on a non-warning-CC can indicate that any warning message is present on a warning-CC. SIB1 on a non-warning-CC can also indicate which DL CC is a warning-CC.

Thus, even if the warning notification is not transmitted on SIB1 e.g. but transmitted in paging, UE can check if any warning message is present by receiving SIB1 from either a warning-CC or a non-warning-CC.

2. Contents of Warning Indication

In an embodiment, the warning notification either includes a DL CC index for a new warning message or not. Whether the warning notification includes a DL CC index for a new warning message or not is determined based on the relationship between the warning notification and a CC.

Figure 9:
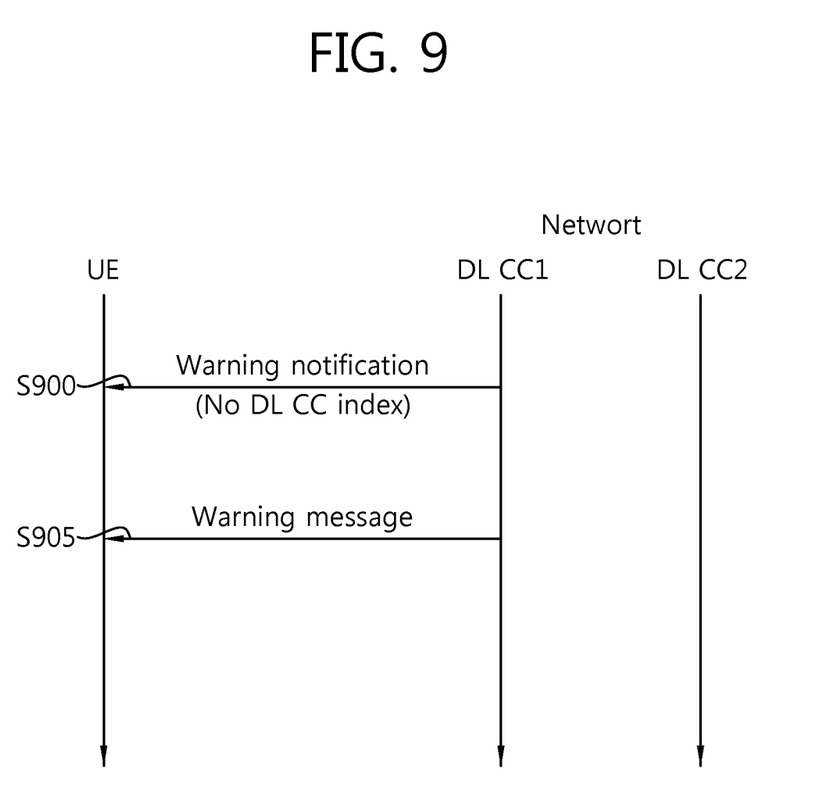
FIG. 9 and FIG. 10 show examples of relationship between the warning notification and a DL CC.
Figure 10:
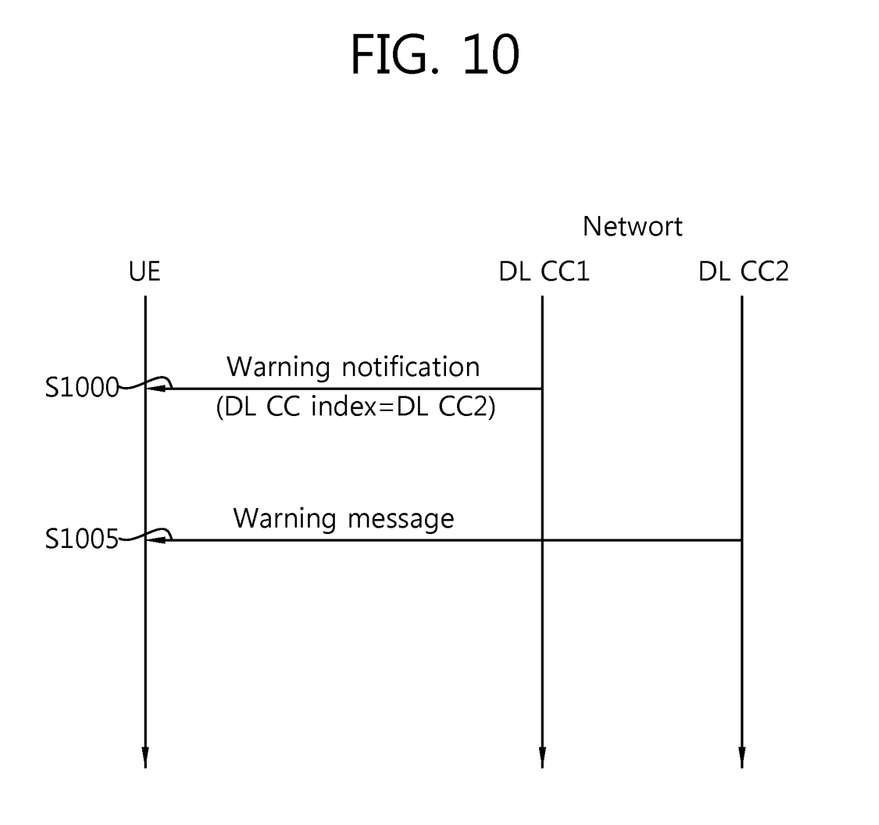

FIG. 9 and FIG. 10 show examples of relationship between the warning notification and a DL CC.

Referring to FIG. 9, a network transmits to the UE via DL CC1 a warning notification without a DL CC index S900. This means that the DL CC1 is a warning-CC. In a case where the warning notification is transmitted on a warning-CC, the warning notification does not include a DL CC index for a new warning message. So the UE assumes that a new warning message is or will be transmitted on the warning-CC where the warning notification was transmitted. And the UE becomes ready to receive the new warning message on the warning-CC.

Then, the network transmits a warning message to the UE via the DL CC1 S905.

Referring to FIG. 10, a network transmits to the UE via DL CC1 a warning notification including a DL CC index S1000. The DL CC index indicates DL CC2. In a case where the warning notification is transmitted on non-warning-CC, the warning notification can includes a DL CC index indicating DL CC(s) among all of the aggregated CCs on which a new warning message is or will be transmitted (i.e. the DL CC index for a new warning message). So, the UE becomes ready to receive the new warning message from the indicated CC(s) which is a warning-CC e.g. during any of DRX periods.

Then, the network transmits to the UE via DL CC2 a warning message S1005.

In another embodiment, the warning notification includes a value tag informing UEs that a new warning message is or will be transmitted on a warning-CC or a non-warning CC. If the warning notification includes the value tag, and when the UE receives the value tag, the UE stores the value tag. And then whenever the UE receives a value tag, the UE compares the stored value tag with the received value tag. If the stored value tag and the received value tag are different, the UE considers a new warning message to be transmitted on the warning-CC.

3. CCs for Transmitting Warning Notification

One or more DL CCs will be configured for a UE. Then, UE would receive the configured DL CCs. UE receives the warning notification from either a warning-CC or one of non-warning-CCs.

If a warning-CC is not configured and only non-warning-CC (s) are configured for the UE, UE can receive warning notification from one of the configured non-warning-CCs. However, even if a warning-CC is not configured and only non-warning-CC (s) are configured for the UE, UE could receive a warning notification from a warning-CC during any of DRX periods.

If a warning-CC is configured for the UE, UE can receive a warning notification from the configured warning-CC.

Alternatively, regardless of the configured DL CCs for UE, system information from each DL CC can indicate which DL CC(s) among all of the aggregated CCs will transmit the warning notification. In this case, UE can receive warning notification indication from the indicated DL CC(s) e.g. during any of DRX periods. In addition, if system information from a certain DL CC does not indicate which DL CC(s) among all of the aggregated CCs will transmit the warning notification, UE assumes that the warning notification is transmitted on the DL CC and then receives the warning notification on the DL CC.

II. Warning Message

There are many cases where a UE receives a warning message.

In an embodiment, if UE assumes that a new warning message will be transmitted from a warning-CC by receiving the warning notification, UE receives the new warning message on the warning-CC. The UE can know one specific warning-CC or the list of warning-CC(s) among the aggregated CCs by receiving system information e.g. SIB1 in a cell.

Because the list of warning-CCs means that there is more than one warning-CC among the aggregated CCs, the warning notification can indicate which DL CC(s) among all of the aggregated CCs will transmit a new warning message (i.e. the DL CC index for a new warning message). In this case, UE can receive the new warning message from the indicated DL warning-CC(s) e.g. during any of DRX periods.

If system information indicates only one specific warning-CC, the UE can receive the new warning message on the warning-CC that the system information indicates. Else if system information does not indicate any warning-CC, the UE assumes that the new warning message is transmitted on the DL CC where the system information was transmitted. Then the UE receives the new warning message on that DL CC.

III. Discard of Message ID/SN and Message Segment

When UE receives a warning message which includes a message ID and a serial number (SN), the UE stores the recently received message ID and SN and if the warning message is not completely received, the UE also store a received segment of the warning message. Then, whenever a cell changes, UE discard the stored message ID, SN and the received segment.

However, if the UE moves between DL CCs which are aggregated, the UE does not discard the stored message ID, SN or the stored segment of the warning message.

The aforementioned functions can be executed by processors such as microprocessors, controllers, microcontrollers, application specific integrated circuits (ASICs) and so on according to software or program codes coded to execute the functions. The design, development and implementation of the codes are obvious to those skilled in the art.

While the present invention has been particularly shown an described with reference to exemplary embodiments thereof, it will be understood by those of ordinary skill in the art that various changes in form and details may be made therein without departing from the spirit and scope of the present invention as defined by the following claims.

What is claimed is:

1. A method of transmitting a warning message in a multiple carrier system performed by a network, the method comprising:
    aggregating multiple downlink component carriers including a first downlink component carrier (CC) and a second downlink component carrier (CC);
    transmitting, to a user equipment (UE), carrier information on the first downlink component carrier, wherein the first downlink CC is a warning CC which is used to transmit a warning message;
    transmitting, to the UE, a notification on the second downlink component carrier (CC), the notification informing the UE of an upcoming transmission of the warning message, wherein the second downlink CC is a non-warning CC that is used for transmitting data other than the warning message, including the notification,
    wherein the notification includes warning CC information which indicates a specific warning CC or a list of warning CCs, wherein if the warning CC information includes the specific warning CC, the warning message will be transmitted on the specific warning CC, and if the warning CC information includes the list of warning CCs, the warning message will be transmitted on one or more downlink CCs included in the list of warning CCs; and
    when the first downlink CC is the specific warning CC or one of the one or more downlink CCs included in the list of warning CCs, transmitting, to the UE, the warning message on the first downlink component carrier,
    wherein the first downlink component carrier is different from the second downlink component carrier,
    wherein the notification is transmitted via a physical downlink control channel (PDCCH) with a public warning system specific radio network temporary identifier (PWS specific RNTI),
    wherein the first downlink component carrier is not used to transmit the notification,
    wherein the second downlink component carrier is not used to transmit the warning message,
    wherein the UE stores a message identity (ID) and a serial number (SN) of the warning message,
    wherein the UE discards the stored message ID and the stored SN if the UE enters into a cell that is different from a current cell, and
    wherein the UE does not discard the stored message ID and the stored SN if the UE moves in between aggregated downlink carriers.

2. The method of claim 1, wherein the warning message is broadcasted in public.

3. The method of claim 1, wherein the carrier information is included in system information of the first downlink component carrier.

4. The method of claim 1, wherein the notification includes a value tag, the value tag changes whenever a different warning message is transmitted.

5. A method of receiving a warning message in a multiple carrier system, in which are aggregated multiple downlink component carriers including a first downlink component carrier (CC) and a second downlink component carrier (CC), performed by a user equipment (UE), the method comprising:
    receiving, from a network, carrier information on the first downlink component carrier, wherein the first downlink CC is a warning CC which is used to receive a warning message;
    receiving, from the network, a notification via the second downlink component carrier, the notification informing the UE of an upcoming transmission of the warning message, wherein the second downlink CC is a non-warning CC that is used for transmitting data other than the warning message, including the notification, wherein the notification includes warning CC information which indicates a specific warning CC or a list of warning CCs, wherein if the warning CC information includes the specific warning CC, the warning message will be transmitted on the specific warning CC, and if the warning CC information includes the list of warning CCs, the warning message will be transmitted on one or more downlink CCs included in the list of warning CCs; and when the first downlink CC is the specific warning CC or one of the one or more downlink CCs included in the list of warning CCs, receiving, from the network, the warning message via the first downlink component carrier, wherein the first downlink component carrier is different from the second downlink component carrier, wherein the notification is received via a physical downlink control channel (PDCCH) with a public warning system specific radio network temporary identifier (PWS specific RNTI), wherein the first downlink component carrier is not used to receive the notification, wherein the second downlink component carrier is not used to receive the warning message, wherein the UE stores a message identity (ID) and a serial number (SN) of the warning message, wherein the UE discards the stored message ID and the stored SN if the UE enters into a cell that is different from a current cell, and wherein the UE does not discard the stored message ID and the stored SN if the UE moves in between aggregated downlink carriers.

6. The method of claim 5, wherein the warning message is broadcasted in public.

7. The method of claim 5, wherein the carrier information is included in system information of the first downlink component carrier.

8. The method of claim 5, wherein the notification includes a value tag, the value tag changes whenever a different warning message is transmitted.

* * * * *